(No Model.)  2 Sheets—Sheet 1.

J. I. HOKE.
CORN HARVESTING MACHINE.

No. 471,119. Patented Mar. 22, 1892.

WITNESSES
F. L. Ourand.
C. W. Seville.

INVENTOR
J. I. Hoke
by J. A. Alexander Attorney (No Model.) 2 Sheets—Sheet 2.
J. I. HOKE.
CORN HARVESTING MACHINE.
No. 471,119. Patented Mar. 22, 1892.
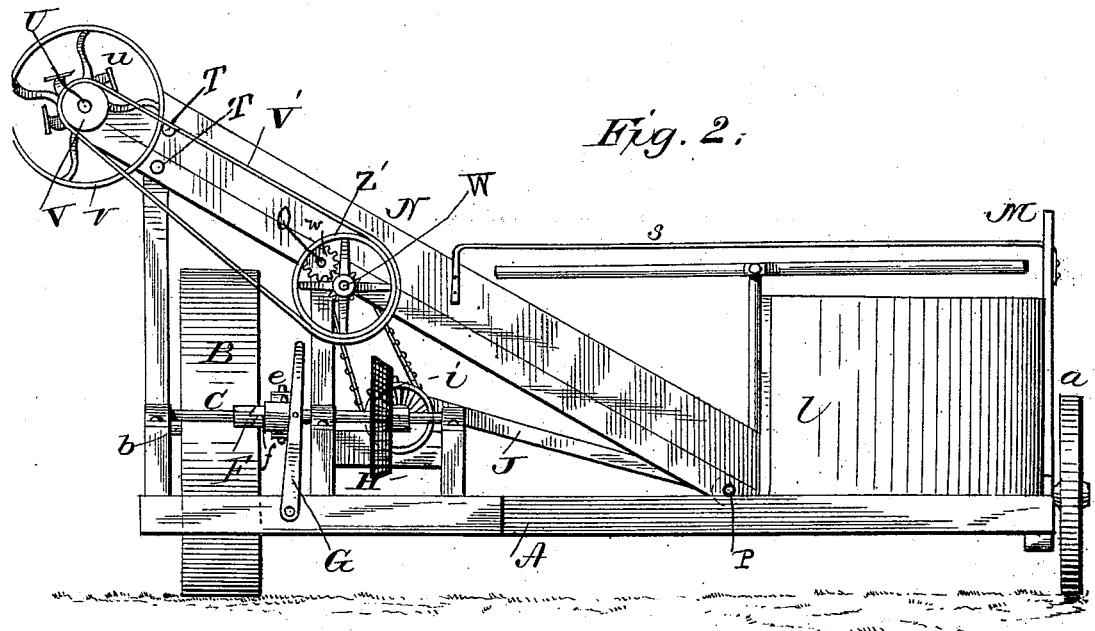
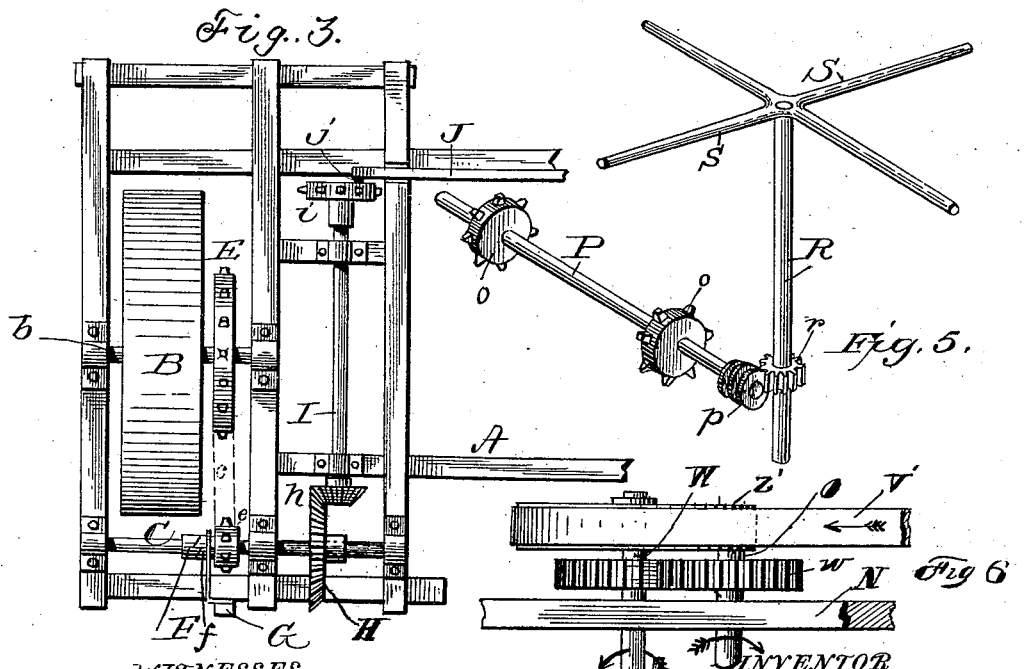
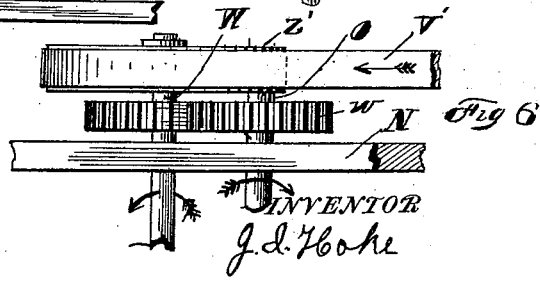
WITNESSES
F. L. Ourand
C. W. Sevills
INVENTOR
J. I. Hoke
T. M. Alexander
Attorney

UNITED STATES PATENT OFFICE.

JOHN I. HOKE, OF SOUTH BEND, INDIANA.

CORN-HARVESTING MACHINE.

SPECIFICATION forming part of Letters Patent No. 471,119, dated March 22, 1892.

Application filed January 28, 1891. Serial No. 379,461. (No model.)

*To all whom it may concern:*

Be it known that I, JOHN I. HOKE, of South Bend, in the county of St. Joseph and State of Indiana, have invented certain new and useful Improvements in Corn-Harvesting Machines; and I do hereby declare that the following is a full, clear, and exact description thereof, reference being had to the accompanying drawings, and to the letters of reference marked thereon, which form part of this specification, in which—

Figure 1:
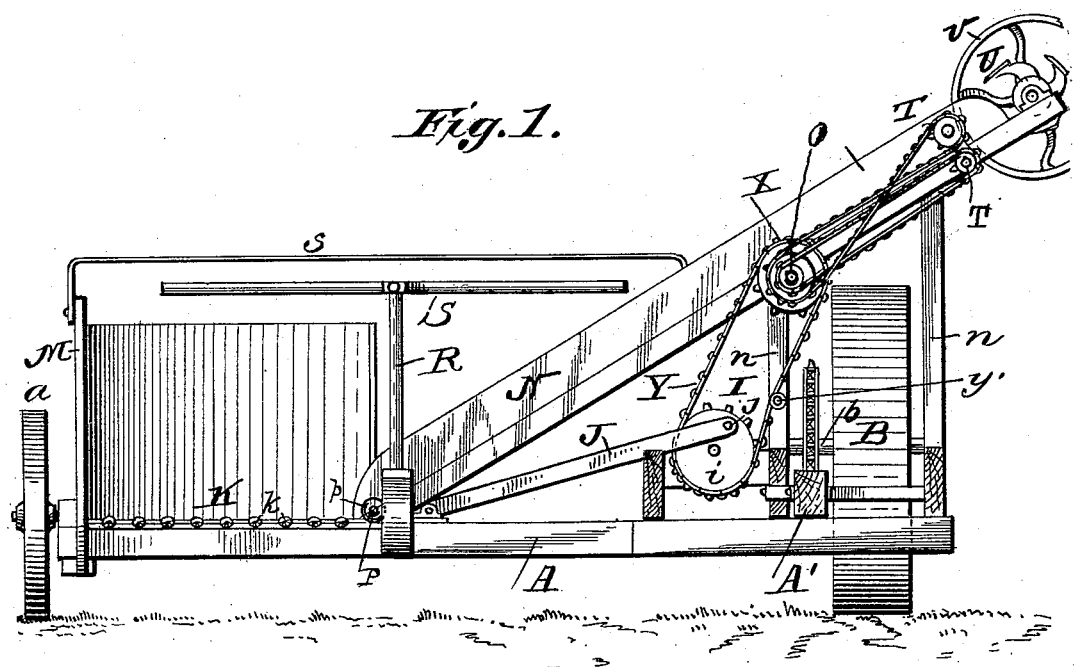
Figure 4:
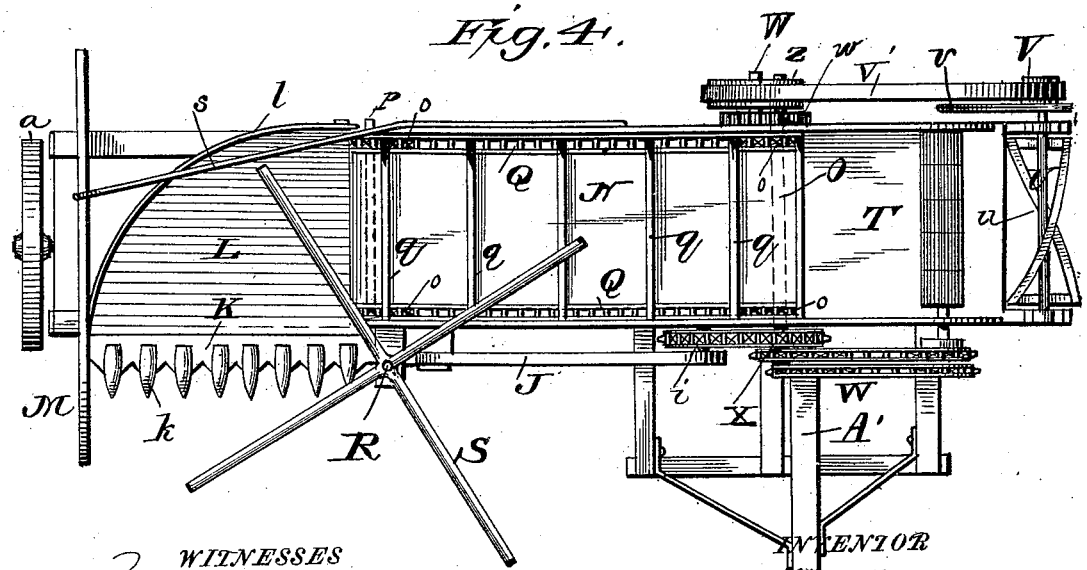

Figure 1 is a front elevation of my improved harvesting-machine. Fig. 2 is a rear view thereof. Fig. 3 is a detail plan view of the driving mechanism of the machine; Fig. 4, a plan view; Fig. 5, a detail. Fig. 6 is a detail view of the shafts O and W and their connections.

This invention is an improvement in harvesting-machines, and is especially designed for harvesting green corn for ensilage purposes, and it is a combined corn cutting and chopping machine, its object being to cut down the cornstalks while standing, convey them to cutting-knives, and chop the stalks into fine particles for ensilage, and deliver the stalks reduced to fit condition for immediate storage in a silo into a wagon or other receptacle which can be driven beside the machine or into removable receptacles which can be carried thereon and emptied when filled, so that the operations of cutting down the standing stalks and then chopping or slicing the severed stalks into fine particles may be performed rapidly and accurately without any manual handling of the corn, whereas heretofore the corn has been first cut down in the field, transported to a cutting-machine, and thence transferred to the silo, necessitating frequent manual handling thereof, making the process of preparing ensilage long and expensive.

The invention consists in certain novel details of construction and combination of parts hereinafter referred to, and particularly described and claimed.

Referring to the drawings by letters, A designates the frame of the machine, about rectangular in plan, and B is a bull-wheel mounted at one end on a short shaft $b$, journaled in proper bearings on the frame and lying parallel with the longest diameter thereof. The other end of the frame is supported on a small caster-wheel $a$.

C designates a shaft lying parallel with shaft $b$ and journaled in bearings on the frame A and driven by means of sprocket-chain $c$ and wheels E $e$ from shaft $b$. Sprocket-wheel $e$ is loosely mounted on shaft C and has a clutch end F, which is adapted to engage a similar opposite clutch-piece $f$, keyed on shaft C, and wheel $e$ can be shifted by a lever G either to engage or disengage the clutch-pieces.

H is a bevel-gear on the end of shaft C, meshing with a small bevel $h$ on the rear end of a short shaft I, journaled transversely in the frame inside of wheel B, and on the front end of shaft I is a sprocket toothed disk $i$, to which is attached a wrist-pin $j$, and to the wrist-pin is connected one end of a reciprocating pitman J, the other end of which is connected to a cutter K, playing through guard-fingers $k$, attached to the front side and near one end of the frame, as indicated. The cutter and fingers may be of any desired construction proper for the work. In rear of the cutter is a platform L, and $l$ is a curved guard rising from the inner rear corner of the platform and extending forward and around to the outer front corner thereof, the front edge of the guard being connected to a fender M, which projects beyond the front edge of the cutter and opens a path for the wheel $a$.

N designates an elevator-trough standing parallel with the frame, its lower end being at the inner end of platform L. Its upper end rises above wheel B and projects beyond the end of the frame.

O P designate shafts journaled at the upper and lower ends of the trough, respectively, and transversely thereto, and $o$ $o$ are sprocket-wheels on said shafts.

Q Q are endless sprocket-chains running over said wheels at opposite sides of the trough, and $q$ $q$ are carrier or elevator strips attached to the said chains and forming therewith the elevating or carrying devices for the stalks.

$p$ is an endless screw on the front end of shaft P, meshing with a worm-gear $r$ on the lower end of a short vertical shaft R, journaled in proper bearings attached to the frame near the heel of the cutter, and S S are a series of horizontal arms attached to the upper end of shaft R, and which when the machine is in operation strike the severed stalks and direct them onto the platform and into the lower end of trough N. A guard-rod s is connected to the fender M and to the rear side of the trough above guard l to prevent unusually tall stalks from falling over the guard.

T T designate a pair of feed-rollers, the shafts of which are journaled in proper bearings attached to the upper end of trough N, the rolls lying transversely thereto, and U designates a shaft journaled in close proximity to the rolls and bearing cutter-knives u, as indicated, and having on one end a fly-wheel v and pulley V. The feed-rolls T are driven by sprocket-chains and pulleys from the shaft O, as indicated in Fig. 1, and shaft O is driven by a sprocket-chain Y and sprocket-wheel X from the sprocket-disk i on shaft I. On the other end of shaft O is a cog w, meshing with a similar cog on a shaft W, journaled transversely in the sides of frame N and on which is mounted a pulley Z, which by means of a belt V' and pulley V drives the cutters. The upper end of trough N is supported on uprights n n, rising from the frame A. If desired, an idler-roller y' may be attached to one of the uprights to keep chain Y from accidental contact with wheel B.

A' designates the tongue attached to the machine in front of wheel B.

When the machine is driven forward and the clutch is in engagement, motion is imparted to the cutter, the reel S, the elevator-belt, and the rolls and cutting-knife. The stalks are first severed by cutter K, thence directed into trough N, and carried up to rolls T, which feed them out to the action of knives u, by which they are chopped into fine pieces, and a wagon can be driven along beside the machine, into which the chopped stalks fall direct; or, if desired, the frame might be elongated and carry a hopper or a removable receptacle to catch the chopped stalks. When the wagon is filled, it can be driven off to the silo and another wagon driven under the trough, and the cutting operation thus proceed with little interruption and the stalks cut and chopped without manual handling. The stalks when cut are swept onto the platform still upright. The arms and guards direct them in falling, so that they fall longitudinally upon the belt in trough N and are carried up to the cutters end first to be chopped thereby.

The driver's seat may be arranged in front or in rear of the platform, and lever G extended or connected to enable the clutch to be readily operated by the driver.

Having described my invention, what I claim as new, and desire to secure by Letters Patent thereon, is—

1. In a corn-harvesting machine, the combination of a wheeled frame having a bull-wheel at one end and a stalk-cutter at the other end and suitable mechanism for operating the cutter from said wheel, an upwardly-inclined trough arranged intermediate the wheel and cutter and extending over the wheel, cutter-knives mounted in the upper end of said trough, an endless carrier-belt for transporting severed stalks from the cutter to the knives, said knives being mounted on a horizontal shaft lying transverse to the trough, and the connections, substantially as described, for driving said belt and cutter, substantially as specified.

2. In a corn-harvesting machine, the combination of a wheeled frame having a bull-wheel at one end and a stalk-cutter at the other end and suitable mechanism for operating the cutter from said wheel, an upwardly-inclined trough arranged intermediate the wheel and cutter and extending over the wheel, cutter-knives mounted in the upper end of said trough, an endless carrier-belt for transporting severed stalks from the cutter to the knives, said knives being mounted upon a horizontal shaft lying transverse to the trough, and the connections, substantially as described, for driving said belt and cutter, the feed-rolls lying between the belt and knives and transversely to the trough, and the devices for driving said rolls, substantially as described.

3. In a corn-harvesting machine, the combination of a wheeled frame having a bull-wheel at one end and a stalk-cutter at the other end and suitable mechanism for operating the cutter from said wheel, an upwardly-inclined trough arranged intermediate the wheel and cutter and extending over the wheel, cutter-knives mounted in the upper end of said trough, an endless carrier-belt for transporting severed stalks from the cutter to the knives, said knives being mounted on a horizontal shaft lying transverse to the trough, and the connections, substantially as described, for driving said belt and cutter, and the reel, platform, and guards for directing the severed stalks onto the belt, substantially as set forth.

4. In a corn-harvesting machine, the combination of a wheeled frame having a bull-wheel at one end and a stalk-cutter at the other end and suitable mechanism for operating the cutter from said wheel, an upwardly-inclined trough arranged intermediate the wheel and cutter and extending over the wheel, cutter-knives mounted in the upper end of said trough, an endless carrier-belt for transporting severed stalks from the cutter to the knives, said knives being mounted upon a horizontal shaft lying transverse to the trough, and the connections, substantially as described, for driving said belt and cutter, the feed-rolls lying between the belt and knives and transversely to the trough, and the devices for driving said rolls, and the reel, platform, and guards for directing the severed stalks onto the belt, substantially as and for the purpose set forth.

5. In a harvesting-machine, the combination of the frame, the platform, the bull-wheel, the trough N, chains Q Q, feed-rolls T, cutter-knives $u$, and reel S, with the shaft O and its connections for driving the chains, cutter-knives, and feed-rolls, the shaft I, the cutter K, and guard $l$, substantially as and for the purpose set forth.

In testimony that I claim the foregoing as my own I affix my signature in presence of two witnesses.

JOHN I. HOKE.

Witnesses:
JAMES DUSHANE,
JEANIE ANDERSON.